June 27, 1933.  W. V. HANKS ET AL  1,915,363
PROCESS FOR THE PRODUCTION OF HYDROGEN FROM HYDROCARBON GASES
Filed May 31, 1930
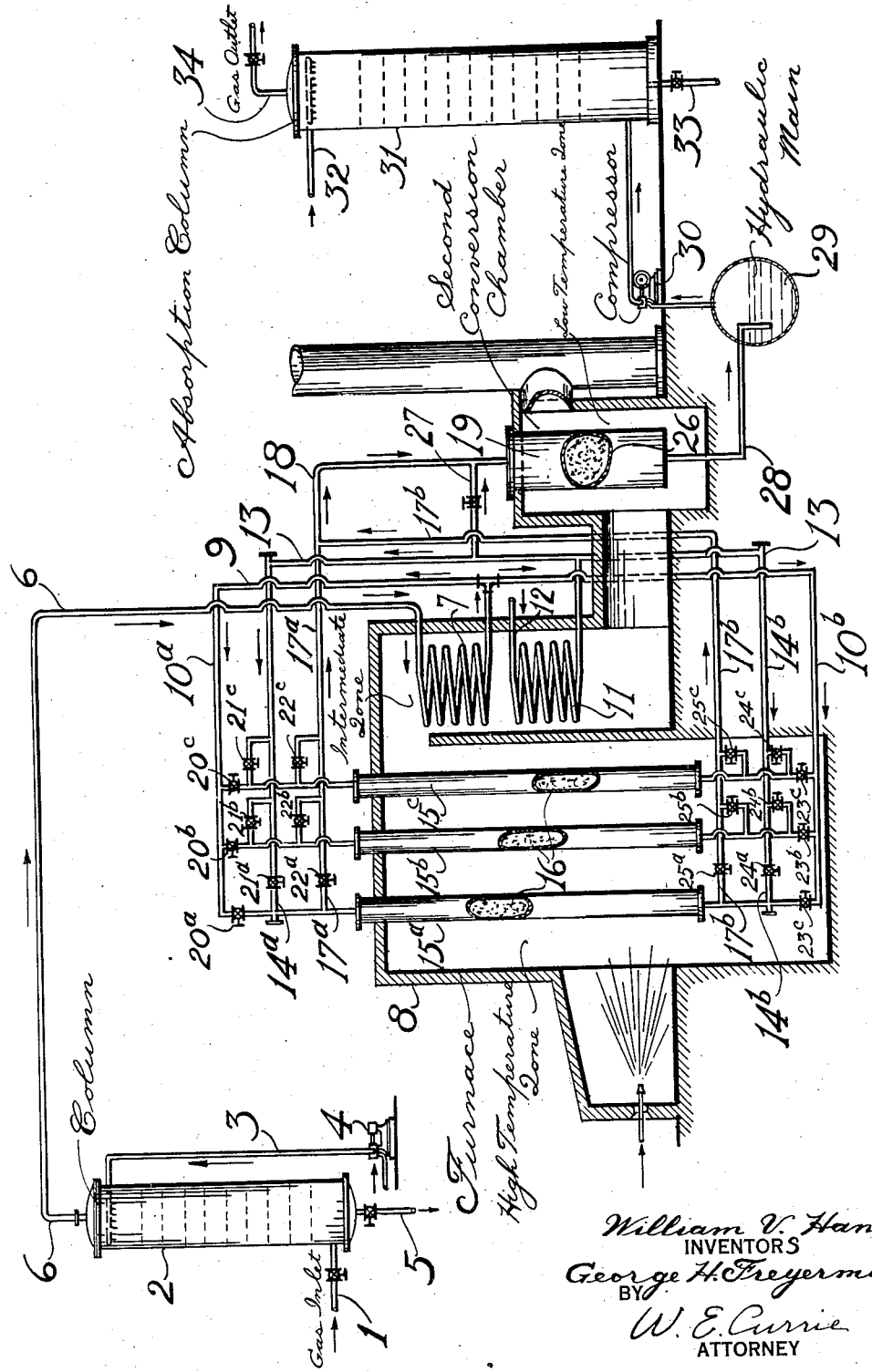

Patented June 27, 1933

1,915,363

UNITED STATES PATENT OFFICE

WILLIAM V. HANKS, OF BATON ROUGE, LOUISIANA, AND GEORGE H. FREYERMUTH, OF ELIZABETH, NEW JERSEY, ASSIGNORS TO STANDARD OIL DEVELOPMENT COMPANY, A CORPORATION OF DELAWARE

PROCESS FOR THE PRODUCTION OF HYDROGEN FROM HYDROCARBON GASES

Application filed May 31, 1930. Serial No. 458,325.

The present invention relates to an improved process for the production of hydrogen or mixtures rich in hydrogen from hydrocarbon gases by reaction with steam and refers particularly to an improved method of operation whereby operation may be conducted for long periods without interruption. The present invention will be fully understood from the following description and drawing which illustrates one form of the apparatus which may be used in the process.

The drawing is a diagrammatic view in sectional elevation of an apparatus constructed to carry out the process herein described and indicates the flow of materials used in the process.

Referring to the drawing numeral 1 indicates a gas line supplying natural or refinery gas which may contain unsaturated hydrocarbons to the base of column 2 where the gas is scrubbed by any suitable sulfur removing agent such as caustic solution. This is supplied to the top of the tower through line 3 by pump 4 and withdrawn by means of pipe 5. Passing from the column, the gas flows through line 6 to preheating coil 7 placed in an intermediate temperature zone of a suitable furnace 8 from which it passes to line 9 and manifolds 10a and 10b. Steam enters superheating coil 11 through line 12 and flows through line 13 to manifolds 14a and 14b. From the manifolds the gas and steam pass into a plurality of reaction tubes 15a, 15b and 15c (three shown) packed with a suitable catalyst 16 and mounted in the high temperature zone of furnace 8. The materials leave the tubes 15, which form the first conversion stage of the process, and pass through manifolds 17a and 17b to line 18 and the second conversion chamber 19. Three manifolds are provided at each end of the reaction tubes so that the gas and steam may be passed through the tubes in either direction. For example, by closing valves 20c, 21c, 22a, 22b, 23a, 23b, 24a, 24b, 25c, and opening valves 20a, 20b, 21a, 21b, 22c, 23c, 24c, 25a, 25b, the gas will flow in a downward direction in tubes 15a and 15b and upwardly in 15c. Secondary reaction chamber 19 is packed with a catalyst 26 and is preferably placed in a low temperature zone of furnace 8. Additional steam may be added to chamber 19 through line 27 from the supply line 13. From 19 the material flows through line 28 to hydraulic main 29 where the gas is cooled and from which it passes to compressor 30 and absorption column 31. A suitable carbon dioxide absorbing medium such as water under pressure is fed in at the top of tower 31 through line 32 and withdrawn by pipe 33. The purified gas comprising largely hydrogen leaves the tower by line 34.

In the operation of the present process it has been found that natural or refinery gases may be converted by means of steam to produce carbon dioxide and hydrogen. The gas may contain moderate amounts of unsaturated hydrocarbons, for example 2 to 12% by volume. It is desirable to remove at least the major quantity of sulfur compounds from the gas to be converted by means of a preliminary caustic wash or otherwise. The primary conversion reaction preferably occurs above about 1200° F. with a moderate excess of steam, say about 100 to 200% excess, and results in the formation of hydrogen and carbon monoxide, but temperature may be much lower say 700° to 1000° F. with higher excess of steam to produce a substantial portion of carbon dioxide. The catalyst in this stage consists of nickel or nickel oxide, with or without other elements or compounds such as alumina, thoria and the like. The reaction mixture is passed from the first stage to a second stage at a much lower temperature, say about 800° F. and a further excess of steam may be added to the gas. In this step the carbon dioxide produced in the first stage is converted to carbon dioxide and additional hydrogen. The second reaction may be catalyzed by a number of suitable materials such as iron oxide. The gas mixture leaving the second conversion stage is cooled and the carbon dioxide removed by some suitable means such as sodium carbonate solution, water under pressure or the like. The final gas consists substantially of hydrogen except for small amounts of unconverted hydrocarbons and carbon monoxide or carbon dioxide which impurities may be below 2 or 3%.

It has been found in the operation of the process that the nickel catalyst gradually loses its catalytic activity owing to the deposition of carbon on the active surface. Although catalyst life may be somewhat prolonged by use of excessive quantities of steam, still it is necessary to discontinue operation at intervals for carbon removal. It is also known that the deposited carbon may be removed by periodic passage of steam alone through the tubes. This method has the disadvantage, however, that the tubes undergoing steaming are lost during that period from efficient hydrogen production. We have now found that the deposition of carbon on the catalytic surface may be greatly reduced and increased periods of hydrogen production may be obtained by periodically reversing the direction of flow of the steam and gas mixture in the tubes. By this method of operation the flow is maintained in one direction preferably for about 8 to 72 hours or more after which by adjustment of suitable valves the flow is caused to travel in the opposite direction preferably for a period of equal length. It is advantageous to reverse the flow in only part of the tubes at the same time in order to maintain a steady production of hydrogen, although, if desired, the flow in all the tubes may be reversed simultaneously. It will be understood that at widely separated intervals, especially when gas difficultly converted to hydrogen is fed to the apparatus, it may be desirable to pass steam alone over the catalyst to remove small accumulations of carbon. These periods of steaming, however, may be much shorter and of much less frequency than when no reversal of flow in the catalytic tubes is used.

Our invention is not to be limited by any theory of the mechanism of the reactions nor to any specific example which may have been given for purpose of illustration, but only by the following claims in which we wish to claim all novelty inherent in our invention.

We claim:

1. An improved process for the production of hydrogen from a hydrocarbon gas selected from the group consisting of refinery or natural gas which comprises flowing said gas with an excess of steam in a periodically reversed direction through a reactor filled with a suitable catalyst containing nickel whereby hydrogen carbon dioxide and carbon monoxide are formed, passing the reactants to a second catalytic stage where the carbon monoxide is converted with steam to carbon dioxide and additional hydrogen, removing the carbon dioxide to leave substantially pure hydrogen.

2. In the process for the production of gases rich in hydrogen in which low molecular weight hydrocarbon gases and steam are passed at a reaction temperature through an elongated catalytic zone over a suitable catalyst containing nickel, an improved method for maintaining the activity of said catalyst comprising the step of periodically reversing the direction of flow of said gases and steam through said catalytic zone.

3. A process according to claim 2 in which the reversal of flow through the catalytic zone is at intervals of about 8 to 72 hours or more.

4. A process according to claim 2 in which the catalyst contains nickel and alumina.

5. A process according to claim 2 in which the hydrocarbon gas contains 2 to 12 percent of unsaturated hydrocarbons.

WILLIAM V. HANKS.
GEO. H. FREYERMUTH.